US009654460B2

(12) United States Patent
Bakar et al.

(10) Patent No.: US 9,654,460 B2
(45) Date of Patent: *May 16, 2017

(54) METHODS, SYSTEMS, AND MEDIA FOR PROVIDING ACCESS CONTROL FOR A COMPUTING DEVICE

(71) Applicant: Google Inc., Mountain View, CA (US)

(72) Inventors: Majd Bakar, San Jose, CA (US); Francis Tsui, Belmont, CA (US); Bryan Bradley Eyler, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,064

(22) Filed: Jun. 20, 2016

(65) Prior Publication Data

US 2016/0301678 A1    Oct. 13, 2016

Related U.S. Application Data

(63) Continuation of application No. 14/572,282, filed on Dec. 16, 2014, now Pat. No. 9,374,358.

(Continued)

(51) Int. Cl.
*H04L 29/06* (2006.01)
*H04L 9/32* (2006.01)
*H04L 29/08* (2006.01)

(52) U.S. Cl.
CPC .......... *H04L 63/08* (2013.01); *H04L 9/3247* (2013.01); *H04L 63/062* (2013.01);
(Continued)

(58) Field of Classification Search
CPC ...................................................... H04L 63/08
(Continued)

(56) References Cited

U.S. PATENT DOCUMENTS 7,822,809 B2 *  10/2010  Dhupelia ............... A63F 13/12
                                                              463/24
2003/0059053 A1   3/2003  Medvinsky et al.
(Continued)

OTHER PUBLICATIONS

Hardt, D. et al, "The OAuth 2.0 Authorization Framework", Internet Engineering Task Force, Oct. 2012, pp. 1-76.
(Continued)

*Primary Examiner* — Longbit Chai
(74) *Attorney, Agent, or Firm* — Byrne Poh LLP

(57) ABSTRACT

Methods, systems, and media for providing access control for a computing device are provided. In some implementations, methods for providing access control for a computing device are provided, the methods comprising: receiving a first request to authenticate the computing device from a first sender device; authenticating the computing device based at least in part on the first request; transmitting a session identifier and a session key to the first sender device; receiving an application identifier associated with the sender device from the computing device; determining, using a hardware processor, whether a sender application executing on the sender device is valid based at least in part on the application identifier; and transmitting the session key to the computing device in response to determining that the sender application is valid.

30 Claims, 5 Drawing Sheets

Related U.S. Application Data

(60) Provisional application No. 61/922,389, filed on Dec. 31, 2013.

(52) U.S. Cl.
CPC ...... *H04L 63/0807* (2013.01); *H04L 63/0823* (2013.01); *H04L 63/0892* (2013.01); *H04L 63/10* (2013.01); *H04L 67/125* (2013.01)

(58) Field of Classification Search
USPC .............................................................. 726/9
See application file for complete search history.

(56) References Cited

U.S. PATENT DOCUMENTS

| | | |
|---|---|---|
| 2003/0163693 A1 | 8/2003 | Medvinsky |
| 2007/0234041 A1 | 10/2007 | Lakshmeshwar et al. |
| 2009/0132813 A1 | 5/2009 | Schubik |
| 2012/0144202 A1 | 6/2012 | Counterman |
| 2012/0271660 A1 | 10/2012 | Harris |
| 2013/0061035 A1 | 3/2013 | Hook et al. |
| 2015/0188899 A1* | 7/2015 | Bakar .................. H04L 67/125 726/9 |

OTHER PUBLICATIONS

International Search Report and Written Opinion of the International Search Authority dated Mar. 23, 2015 in International Patent Application No. PCT/US2014/070649.

\* cited by examiner

METHODS, SYSTEMS, AND MEDIA FOR PROVIDING ACCESS CONTROL FOR A COMPUTING DEVICE

CROSS REFERENCE TO RELATED APPLICATIONS

This is a continuation of U.S. patent application Ser. No. 14/572,282, filed Dec. 16, 2014, which claims the benefit of U.S. Provisional Patent Application No. 61/922,389, filed Dec. 31, 2013, which are hereby incorporated by reference herein in their entireties.

TECHNICAL FIELD

Methods, systems, and media for providing access control for a computing device are provided. More particularly, the disclosed subject matter relates to providing access control for a computing device using application authentication.

BACKGROUND

A computing device (e.g., a digital media player, a game console, etc.) may present media content under the control of an authorized application on a sender device (e.g., a mobile phone, a tablet computer, etc.). For example, a user can search for video content using the authorized sender device. The authorized application can then send information about the video content to a computing device, which can cause the video content to be presented on a television, during an authorized control session. However, conventional approaches do not provide access control schemes that can protect a computing device from messages or commands transmitted from unauthorized applications. For example, a malicious application residing on an authorized sender device may be able to transmit messages or commands to a conventional computing device as long as the sender device is connected to the computing device and authorized to communicate with the computing device.

Therefore, new mechanisms for providing access control for a computing device are desirable.

SUMMARY

Methods, systems, and media for providing access control for a computing device are provided. In some implementations, methods for providing access control for a computing device are provided, the methods comprising: receiving a first request to authenticate the computing device from a first sender device; authenticating the computing device based at least in part on the first request; transmitting a session identifier and a session key to the first sender device; receiving an application identifier associated with the sender device from the computing device; determining, using a hardware processor, whether a sender application executing on the sender device is valid based at least in part on the application identifier; and transmitting the session key to the computing device in response to determining that the sender application is valid.

In some implementations, systems for providing access control for a computing device are provided, the systems comprising at least a hardware processor that is configured to: receive a first request to authenticate the computing device from a first sender device; authenticate the computing device based at least in part on the first request; transmit a session identifier and a session key to the first sender device; receive an application identifier associated with the sender device from the computing device; determine whether a sender application executing on the sender device is valid based at least in part on the application identifier; and transmit the session key to the computing device in response to determining that the sender application is valid.

In some implementations, non-transitory media containing computer-executable instructions that, when executed by a processor, cause the processor to perform a method for providing access control for a computing device are provided, the method comprising: receiving a first request to authenticate the computing device from a first sender device; authenticating the computing device based at least in part on the first request; transmitting a session identifier and a session key to the first sender device; receiving an application identifier associated with the sender device from the computing device; determining whether a sender application executing on the sender device is valid based at least in part on the application identifier; and transmitting the session key to the computing device in response to determining that the sender application is valid.

In some implementations, systems for providing access control for a computing device are provided, the systems comprising: means for receiving a first request to authenticate the computing device from a first sender device; means for authenticating the computing device based at least in part on the first request; means for transmitting a session identifier and a session key to the first sender device; means for receiving an application identifier associated with the sender device from the computing device; means for determining whether a sender application executing on the sender device is valid based at least in part on the application identifier; and means for transmitting the session key to the computing device in response to determining that the sender application is valid.

In some implementations, the systems further comprise: means for receiving, from the computing device, a session token associated with the session key and the session identifier; and means for authenticating the computing device based at least in part on the session token.

In some implementations, the first request to authenticate the computing device comprises a certificate associated with the computing device.

In some implementations, the systems further comprise means for authenticating the computing device by validating the certificate associated with the computing device.

In some implementations, the systems further comprise means for receiving a second request to authenticate the computing device from a second sender device, wherein the second request comprises the certificate associated with the computing device; and means for transmitting the session key and the session identifier to the second computing device in response to determining that the second sender device is associated with the application identifier.

In some implementations, the second request comprises the application identifier.

In some implementations, the first request to authenticate the computing device comprises a first digital signature generated by the computing device.

In some implementations, the systems further comprise means for authenticating the computing device by verifying the first digital signature.

In some implementations, the systems further comprise means for receiving a second digital signature from the computing device; and means for determining whether the computing device is a valid receiver based at least in part on the second digital signature.

In some implementations, the computing device is a digital media receiver.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
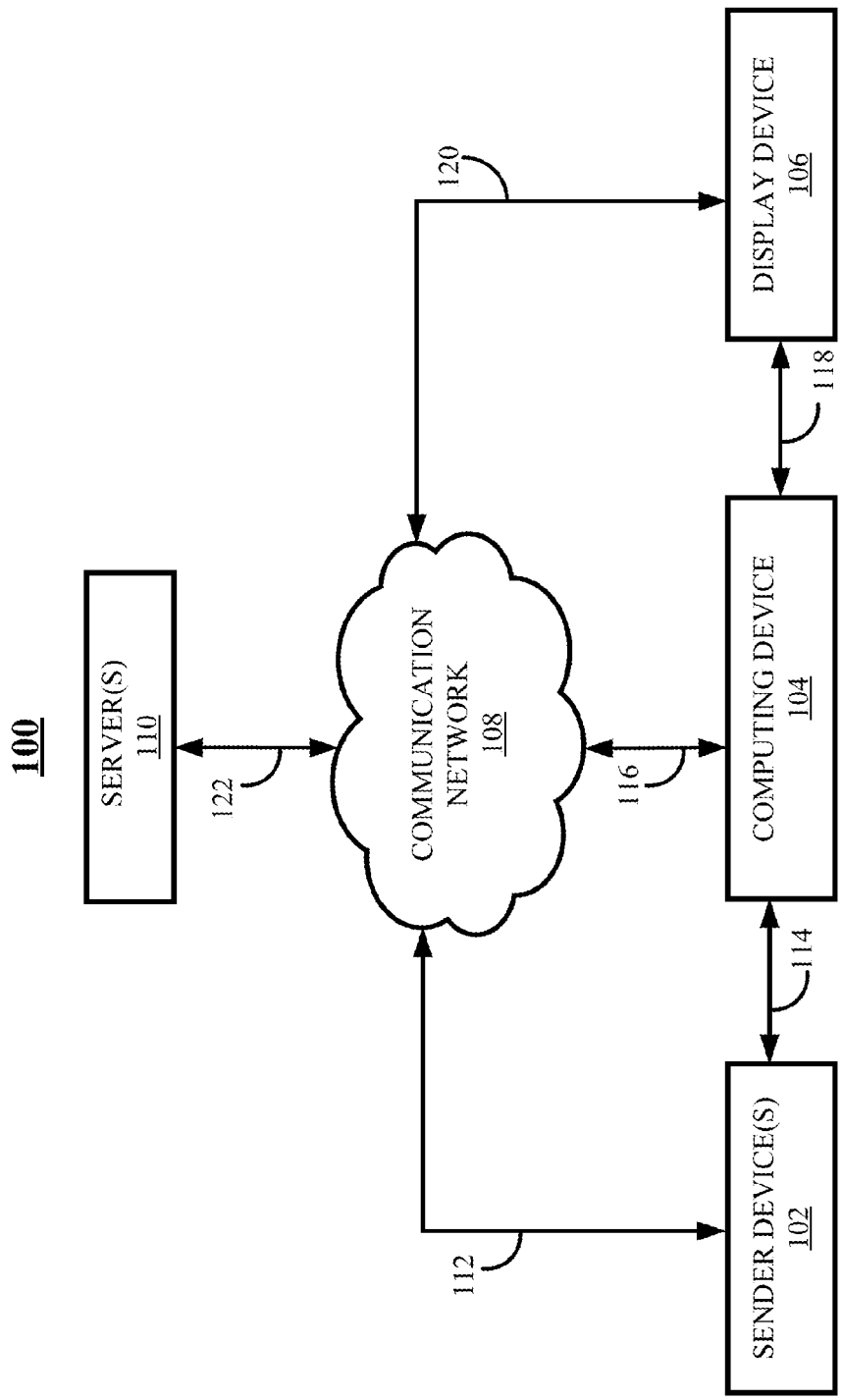
FIG. 1 shows a generalized block diagram of an example of a system for providing access control for a computing device in accordance with some implementations of the disclosed subject matter.

In accordance with various implementations, as described in more detail below, mechanisms, which can include systems, methods, and computer-readable media, for providing access control for a computing device are provided.

The mechanisms can perform a variety of functions. For example, the mechanisms can establish a secure communication channel and/or a control session for a sender device and a computing device without requiring a user to manually pair the sender device and the computing device. In a more particular example, the mechanisms can establish the secure communication channel and/or the control session in response to authenticating the computing device and the sender device (and/or a sender application executing on the sender device).

As another example, the mechanisms can enable multiple sender devices to control the same activity (e.g., rendering a video) on a computing device. In a more particular example, the mechanisms can match a session key that can be used to control the activity to an application identifier that identifies a sender application executing on a sender device. The mechanisms can then transmit the session key to multiple sender devices associated with the application identifier to enable the sender devices to control the activity using the session key.

As referred to herein, a sender application can be a Web browser, a streaming application, a gaming application, a mobile application, a media player, and/or any suitable application that can execute on a sender device and can communicate with a computing device. Similarly, a receiver application can be a Web browser, a streaming application, a gaming application, a mobile application, a media player, an e-mail client, and/or any suitable application that can execute on a computing device and can communicate with a sender device.

In some implementations, the mechanisms can be implemented using one or more sender devices, a computing device, a server, and/or any other suitable devices. In some implementations, the sender device can discover a computing device and transmit a certificate associated with the computing device (e.g., an X.509 certificate) and a digital signature generated by the computing device (e.g., a signed nonce) to a server. The server can then determine whether the computing device is a valid receiver based on the certificate and the digital signature (e.g., by validating the certificate and verifying the digital signature).

In some implementations, the server can transmit a session identifier and a session key to the sender device in response to determining that the computing device is a valid receiver. In some implementations, the sender device can generate a session token by signing the session identifier, a nonce, and/or other suitable data using the session key in response to receiving the session identifier and the session key.

In some implementations, the sender device can send a request to launch an activity and the session token to the computing device. In response to receiving the request and the session token, the computing device can send an identifier associated with a sender application executing on the sender device (e.g., an application identifier), the session token, and/or any other suitable data to request the server to authenticate the computing device and the sender application. The server can then send the session key to the computing device upon authenticating the computing device and/or the sender application.

Turning to FIG. 1, a generalized block diagram of an example 100 of a system for providing access control for a computing device in accordance with some implementations of the disclosed subject matter is shown. As illustrated, system 100 can include one or more sender devices 102, a computing device 104, a display device 106, a communication network 108, one or more servers 110, communication paths 112, 114, 116, 118, 120, and 122, and/or any other suitable components.

Sender device(s) 102 can be any suitable device that is capable of communicating with a computing device and/or a server, controlling a computing device, causing media content to be presented via a computing device, and/or performing any other suitable functions. Examples of sender devices can include a mobile phone, a laptop computer, a tablet computer, a desktop computer, a wearable computer, a remote control, and/or any other suitable device.

Computing device 104 can be any suitable device for communicating with sender device(s) 102 and/or a server and/or performing any other suitable functions. For example, in some implementations, computing device 104 can be capable of receiving, processing, converting, and/or transmitting media content and/or causing media content to be presented on display device 106. As another example, in some implementations, computing device 104 can be capable of executing instructions transmitted by sender device(s) 102 and/or a server. Examples of computing devices can include digital media receivers (e.g., a streaming media player, a media center computer, and/or any other device capable of causing media content to be presented), mobile user devices (e.g., a mobile phone, a tablet computer, a laptop computer, a wearable computer, and/or any other suitable mobile user device), non-mobile user devices (e.g., a desktop computer, a game console, a television, and/or any other suitable non-mobile user device), smart appliances (e.g., a thermostat, an alarm such as a fire alarm, an intrusion alarm, etc., a refrigerator, an oven, a coffee maker, and/or any other suitable smart appliance), and/or any other suitable device capable of performing the functions described herein.

Display device 106 can be any suitable device that is capable of receiving, converting, processing, and/or displaying media content and/or performing any other suitable functions, such as a media center computer, a CRT display, an LCD, an LED display, a plasma display, a touch-screen display, a simulated touch screen, a television device, a tablet user device, a mobile phone, a gaming console, and/or any other suitable device. In some implementations, display device 106 can be three-dimensional capable.

Communication network 108 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

Server(s) 110 can include any suitable device that is capable of authenticating sender device(s) 102 and computing device 104, authenticating applications associated with sender device(s) 102 and computing device 104, generating and/or transmitting cryptographic keys, and/or performing any other suitable functions.

In some implementations, as described hereinbelow in connection with FIGS. 3-5, a sender device 102 can discover computing device 104 and cause an activity (e.g., launching a receiver application, streaming a video, and/or any other suitable activity) to be launched on computing device 104. In some implementations, server(s) 110 can transmit a session key to computing device 104 and the sender device in response to authenticating computing device 104, a sender application executing on the sender device, and/or any other suitable application and/or device.

In some implementations, communication between sender device 102 and computing device 104 can be protected using the session key. For example, messages, commands, and/or any other suitable data transmitted between the sender device and the computing device can be processed (e.g., signed and/or encrypted) using the session key. As another example, the sender device can process commands (e.g., play, pause, stop, volume, open, close, and/or any other suitable command) using the session key and transmit the processed commands to computing device 104 to control the computing device and/or the activity launched on computing device 104.

In some implementations, server(s) 110 can assign the session key to multiple sender devices to enable the sender devices to control the activity launched on computing device 104. For example, server(s) 110 can generate and transmit a session key to a first sender device associated with an application identifier (e.g., an application identifier that identifies a sender application executing on the first sender device) as described above. Server(s) 110 can transmit the session key to a second sender device in some implementations in which the second sender device is associated with the same application identifier.

In some implementations, sender device(s) 102, computing device 104, display device 106, and server(s) 110 can be connected to communication network 108 through communication links 112, 116, 120 and 122, respectively. In some implementations, computing device 104 can be connected to sender device 102 and display device 106 through communication links 114 and 118, respectively. In some implementations, communication links 112, 114, 116, 118, 120, and 122 can be any suitable communication links, such as network links, dial-up links, wireless links, hard-wired links, any other suitable communication links, or a combination of such links.

Figure 2:
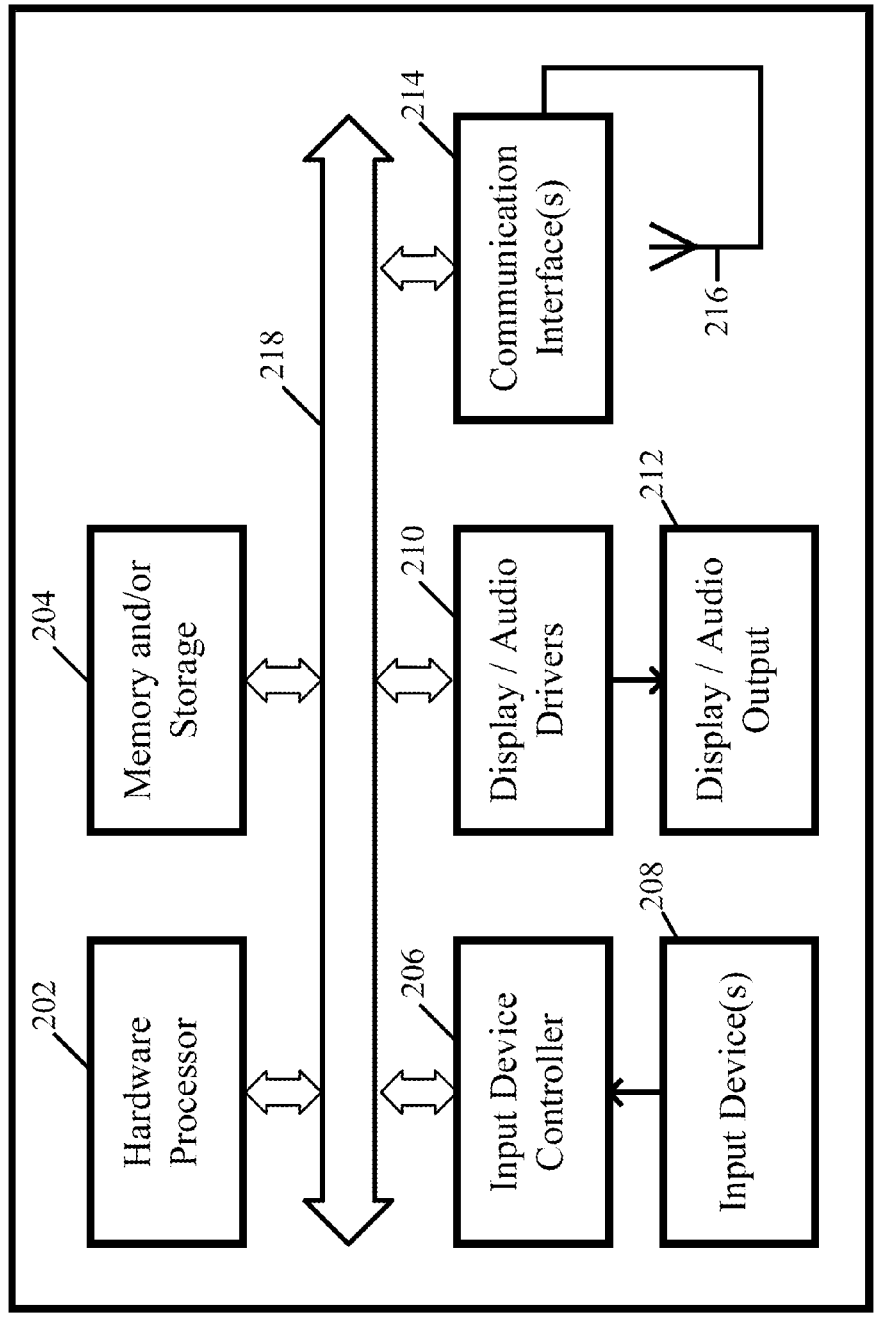
FIG. 2 shows an example of hardware that can be used in a sender device, a computing device, a server, and/or a display device in accordance with some implementations of the disclosed subject matter.

Each of sender device(s) 102, computing device 104, display device 106, and server(s) 110 can include and/or be any of a general purpose device such as a computer or a special purpose device such as a client, a server, and/or any other suitable device. Any such general purpose computer or special purpose computer can include any suitable hardware. For example, as illustrated in example hardware 200 of FIG. 2, such hardware can include a hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor, dedicated logic, and/or any other suitable circuitry for controlling the functioning of a general purpose computer or special purpose computer in some implementations.

Memory and/or storage 204 can be any suitable memory and/or storage for storing programs, data, media content, and/or any other suitable content in some implementations. For example, memory and/or storage 204 can include random access memory, read only memory, flash memory, hard disk storage, optical media, and/or any other suitable storage device.

Input device controller 206 can be any suitable circuitry for controlling and receiving input from one or more input devices 208 in some implementations. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 210 can be any suitable circuitry for controlling and driving output to one or more display and audio output circuitries 212 in some implementations. For example, display/audio drivers 210 can be circuitry for driving an LCD display, a speaker, an LED, and/or any other display/audio device.

Communication interface(s) 214 can be any suitable circuitry for interfacing with one or more communication networks, such as communication network 108 in some implementations. For example, interface(s) 214 can include network interface card circuitry, wireless communication circuitry, and/or any other suitable circuitry for interfacing with one or more communication networks.

Antenna 216 can be any suitable one or more antennas for wirelessly communicating with a communication network in some implementations. In some implementations, antenna 416 can be omitted when not needed.

Bus 218 can be any suitable mechanism for communicating between two or more of components 202, 204, 206, 210, and 214 in some implementations.

Any other suitable components can be included in hardware 200 in accordance with some implementations.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/ or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 3:
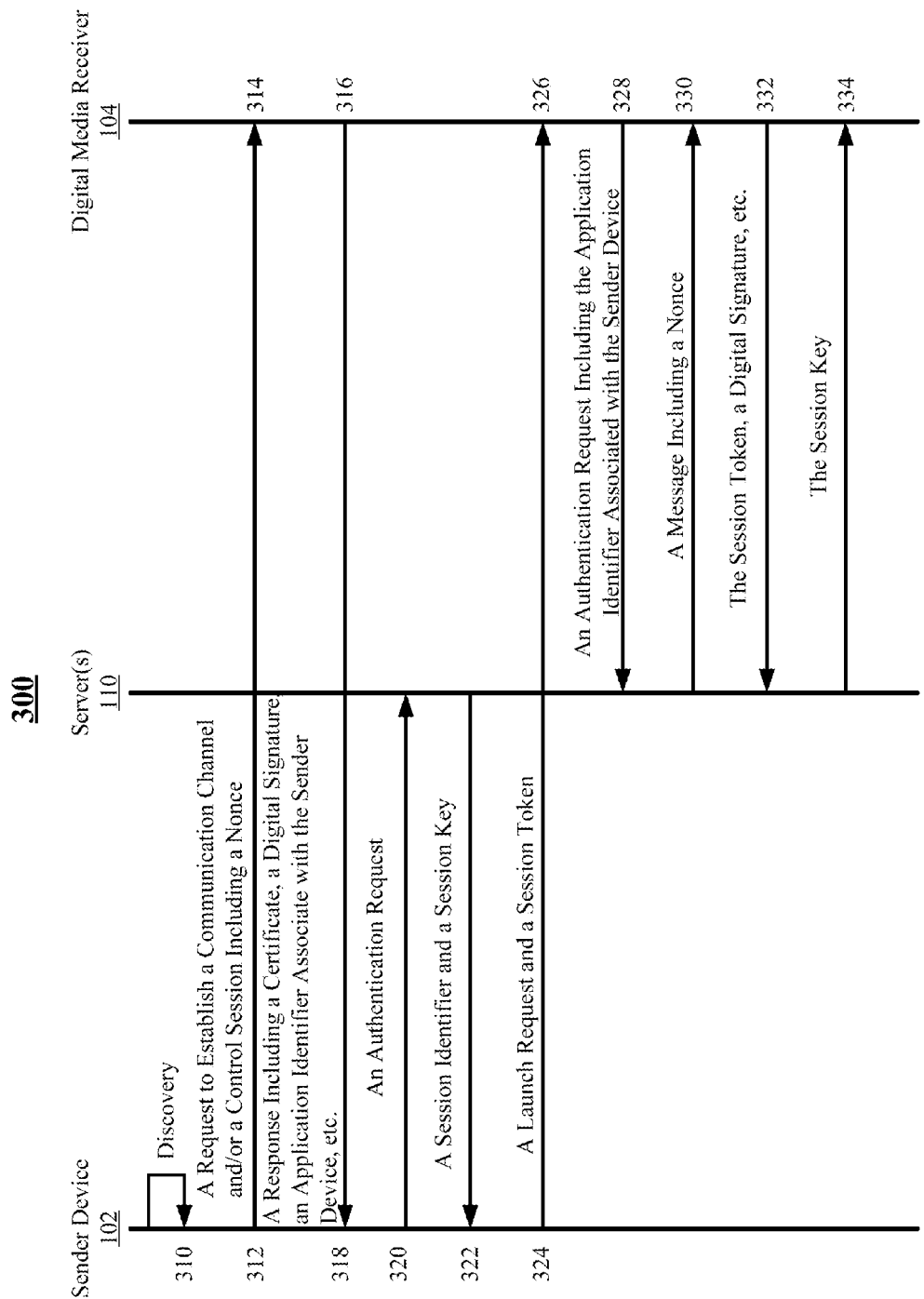
FIG. 3 shows a flow chart of an example of a process for providing access control for a digital media receiver in accordance with some implementations of the disclosed subject matter.
Figure 4:
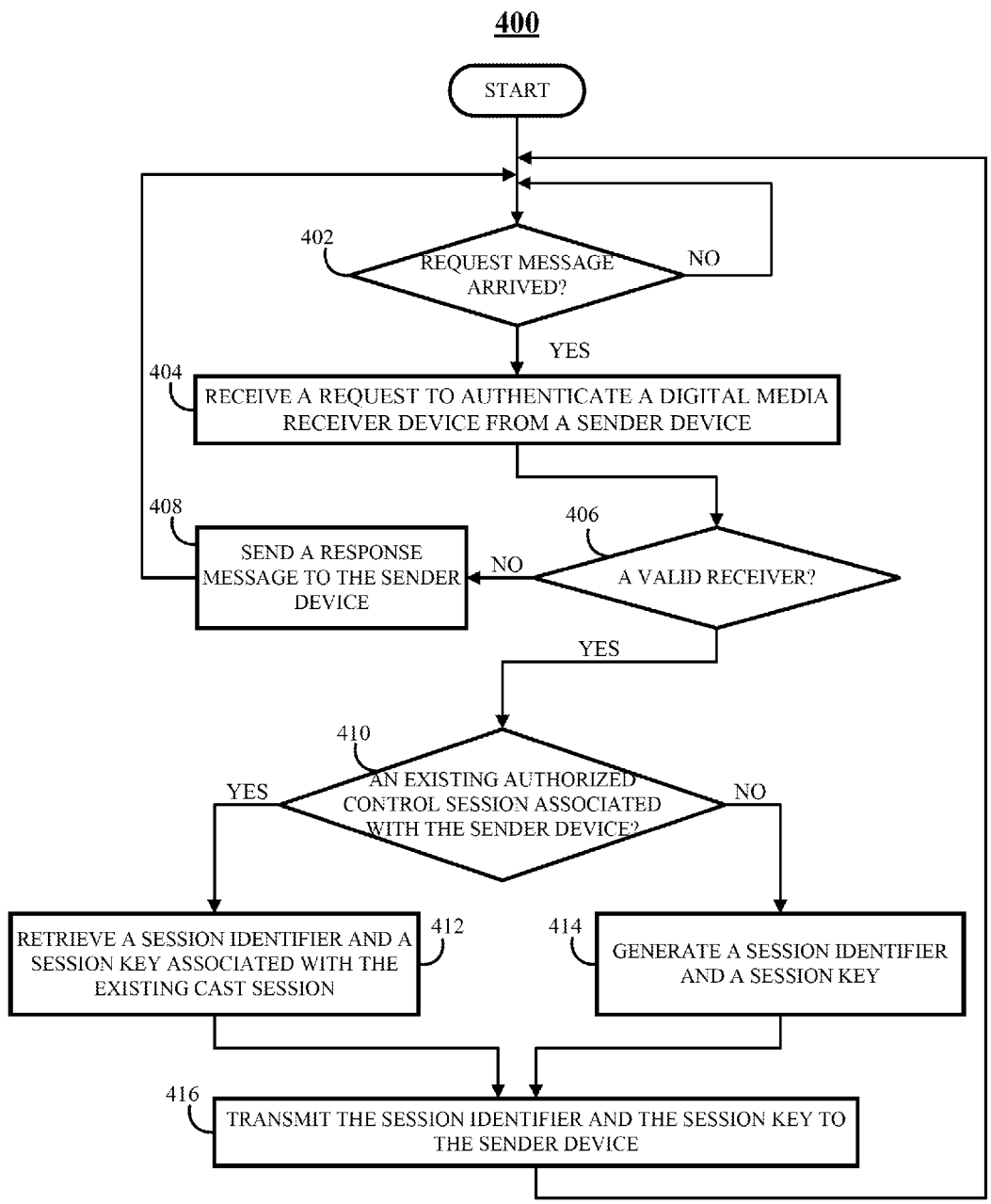
FIG. 4 shows a flow chart of an example of a process for providing access control for a digital media receiver using application authentication in accordance with some implementations of the disclosed subject matter.
Figure 5:
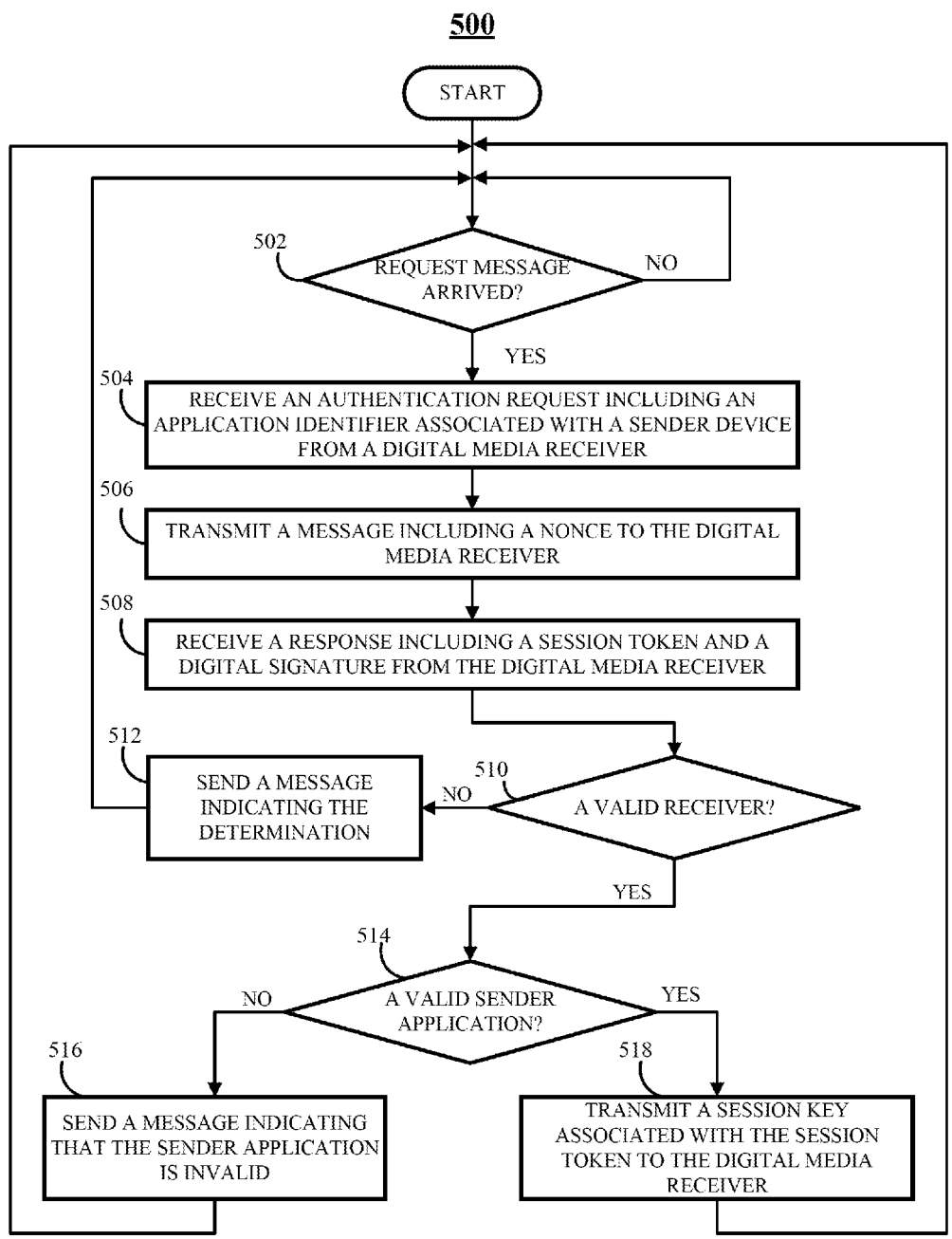
FIG. 5 shows a flow chart of an example of a process for providing access control for a digital media receiver by authenticating a sender application in accordance with some implementations of the disclosed subject matter.

FIGS. 3-5 show examples of processes for providing access control for a computing device in accordance with some implementations of the disclosed subject matter. Although the processes shown in and discussed below in connection with FIGS. 3-5 describe the computing device as a digital media receiver, in some implementations, the computing device can be any other suitable device, as described above in connection with FIG. 1.

Turning to FIG. 3, a flowchart of an example 300 of a process for performing access control for a digital media receiver in accordance with some implementations of the disclosed subject matter is shown. In some implementations, process 300 can be implemented using a sender device, a digital media receiver, and a server, each of which can include a hardware processor. For example, as shown in FIG. 3, process 300 can be implemented by a sender device 102, a server 110, and a digital media receiver 104 of FIG. 1.

As illustrated, process 300 can begin by a sender device discovering a digital media receiver at 310. The digital media receiver(s) can be discovered in any suitable manner. For example, the sender device can search a network (e.g., a WIFI network) for digital media receivers that are connected to the network based on a suitable networking scheme, such as the Universal Plug and Play (UPnP), the multicast Domain Name System (mDNS), and/or any other suitable scheme. As another example, the sender device can query a server and request information about nearby digital media receivers. As yet another example, in some implementations, the sender device can determine that a digital media receiver is nearby using any suitable technique or combination of techniques. As a more particular example, in some implementations, the sender device can receive a signal (e.g., an audio signal, a visual signal, and/or any other suitable signal) transmitted from the digital media receiver. In some implementations, the received signal can include any suitable information, such as an identifier of the digital media receiver (e.g., a name and/or model number associated with the digital media receiver, a name of a manufacturer associated with the digital media receiver, an IP address associated with the digital media receiver, and/or any other suitable identifying information).

In some implementations in which multiple digital media receivers are discovered, the sender device can select a digital media receiver from the discovered digital media receivers. A digital media receiver can be selected in any suitable manner. For example, a digital media receiver can be selected based on a user selection. As another example, a digital media receiver can be selected by filtering the discovered digital media receivers based on models and/or manufacturers of the discovered digital media receivers, applications and/or communication protocols supported by the digital media receivers, and/or any other suitable information about the discovered digital media receivers.

Next, at 312, the sender device can send to the digital media receiver a request to establish a communication channel and/or a control session. The request can include any suitable information. For example, the request can include a nonce, such as a timestamp, a counter, a random number, a hash value, and/or any other suitable value. As another example, the request can include an application identifier associated with the sender device (e.g., an application identifier that identifies a sender application executing on the sender device), a user-agent string, and/or any other suitable information relating to the sender device. In some implementations, the request can be generated and/or transmitted under any suitable communication protocol, such as the WebSocket protocol, the Transmission Control Protocol (TCP), and/or any other suitable communication protocol.

In some implementations, upon receiving the request to establish a communication channel and/or a control session at 314, the digital media receiver can generate a response based on the request and transmit the response to the sender device at 316. The response can include any suitable information. For example, the response can include a certificate associated with the digital media receiver. In a more particular example, the certificate can be tied to a key pair (e.g., a public key and a private key) and can be chained to a known root of trust. In some implementations, the certificate can be a hardware-backed X.509 certificate.

As another example, the response message can include a digital signature generated by the digital media receiver. In some implementations, the digital signature can be generated in any suitable manner. For example, the digital signature can be generated by processing one or more suitable portions of the request received at 314 using a private key associated with the digital media receiver. In a more particular example, the digital media receiver can sign the nonce, the user-agent string, the identifier associated with the sender device, and/or any other suitable information contained in the request using the private key. In such an example, the digital signature can include a signed nonce that is generated by signing the nonce received from the sender device using the private key.

In some implementations, in response to receiving the response from the digital media receiver at 318, the sender device can transmit an authentication request to a server at 320. The authentication request can include any suitable information about the digital media receiver and/or the sender device. For example, the authentication request can include the certificate associated with the digital media receiver, the digital signature generated by the digital media receiver, the nonce transmitted at 312, and/or any other suitable information relating to the digital media receiver. As another example, the request can include the application identifier associated with the sender device and/or any other suitable information relating to the sender device. In a more particular example, the application identifier can include any suitable length of numbers, symbols, characters, and/or any other suitable values that can be used to identify a sender application executing on the sender device.

In some implementations, the authentication request can be generated and/or transmitted via an encrypted communication protocol, such as the Hypertext Transfer Protocol Secure (HTTPS) and/or any other suitable communication protocol that utilizes a cryptographic protocol, such as Security Sockets Layer (SSL), Transport Layer Security (TLS), and/or any other suitable cryptographic protocol.

At 322, the sender device can receive a session identifier and a session key from the server. The session identifier can include any suitable data that can be used to identify a session, such as any suitable length of random numbers, symbols, characters, hash values, and/or any other suitable values that can be used to identify a session. In some implementations, the session key can be any suitable cryptographic key that can be used to sign, encrypt and/or decrypt messages in an authorized control session. In some implementations, the session key can be an ephemeral signing key.

In some implementations, the sender device can generate a session token upon receipt of the session identifier and the session key. The session token can be generated in any suitable manner. For example, the session token can be generated by signing the session identifier, a timestamp, a nonce, and/or any other suitable data using the session key.

At 324, the sender device can transmit a launch request and the session token to the digital media receiver. The launch request can include any suitable information relating to a request to launch an activity on the digital media receiver. For example, the launch request can include a description of the activity to be launched (e.g., launching a receiver application or rendering a video), a receiver application that can be used to launch the activity (e.g., a Web browser, a media player, a streaming program, and/or any other suitable program that can render a video), parameters that can be used to launch the activity (e.g., a uniform resource locator (URL) associated with a video to be rendered), and/or any other suitable information relating to the activity to be launched.

In some implementations, in response to receiving the launch request and the session token at 326, the digital media receiver can transmit an authentication request to the server at 328. The authentication request can include any suitable information. For example, the authentication request can include an application identifier associated with the sender device, such as the application identifier that identifies the sender application executing on the sender device.

At 330, the digital media receiver can receive a message including a nonce from the server. In some implementations, the nonce can correspond to a timestamp, a counter, a random number, a hash value, and/or any other suitable value.

Next, the digital media receiver can generate a response based on the message and transmit the response to the server at 332. The response can be generated in any suitable manner and can include any suitable information. For example, the response can include the session token, a certificate associated with the digital media receiver (e.g., an X.509 certificate), a digital signature generated based on the message received from the server (e.g., a signed nonce generated by signing the nonce with a private key associated with the digital media receiver), and/or any other suitable information.

At 336, the digital media receiver can receive a response indicating whether the identifier associated with the sender device is valid (e.g., whether the identifier identifies a valid sender application). Additionally, the response can include the session key associated with the session token.

Turning to FIG. 4, a flow chart of an example 400 of a process for providing access control for a digital media receiver using application authentication in accordance with some implementations of the disclosed subject matter is shown. In some implementations, process 400 can be implemented by a suitable server, such as a server 110 of FIG. 1.

As illustrated, process 400 can begin by waiting for a request message to arrive at 402. For example, process 400 can listen on a particular port on a server and determine whether a request message has arrived at the port. In some embodiments, while waiting, process 400 can process request messages, generate and/or transmit response messages, and/or perform any other suitable function.

At 404, process 400 can receive a request to authenticate a digital media receiver from a sender device. The request message can include any suitable information relating to the digital media receiver and/or the sender device. For example, the request message can include a digital signature generated by the digital media receiver (e.g., a signed nonce), a message based on which the digital signature is generated (e.g., a nonce), a certificate associated with the digital media receiver (e.g., an X.509 certificate), and/or any other suitable information relating to the digital media receiver. As another example, the request message can include an application identifier associated with the sender device (e.g., an application identifier that identifies a sender application executing on the sender device), a client-agent string, and/or any other suitable information relating to the sender device.

In some implementations, the request to authenticate the digital media receiver can be received in any suitable manner. For example, the request can be received via one or more HTTPS request messages.

Next, at 406, process 400 can determine whether the digital media receiver is a valid receiver. This determination can be made in any suitable manner. For example, the determination can be made by validating the certificate associated with the digital media receiver using a suitable authentication function. In a more particular example, the certificate associated with the digital media receiver can be validated based on a chain of trust.

As another example, the determination can be made by verifying the digital signature associated with the digital media receiver using a suitable verification algorithm. In a more particular example, the digital signature can be verified by processing the digital signature using a public key, processing the message based on which the digital signature was generated (e.g., using a suitable hash function), and comparing the processed digital signature and the processed message.

In some implementations, in response to determining that the digital media receiver is not a valid receiver, process 400 can send a response message to the sender device indicating such determination at 408 and can then loop back to 402.

Alternatively, process 400 can determine whether there is an existing authorized control session associated with the sender device at 410. This determination can be made in any suitable manner. For example, an authorized control session can be regarded as being associated with the sender device when the authorized control session is determined to correspond to the application identifier associated with the sender device. In a more particular example, the authorized control session can have been established for the sender application identified by the application identifier for a suitable sender device (e.g., the sender device or another sender device) and the digital media receiver using process 300 of FIG. 3.

In some implementations, in response to determining that there is an existing authorized control session associated with the sender device, process 400 can retrieve a session identifier and a session key associated with the existing authorized control session at 412.

Alternatively, process 400 can generate a session identifier and a session key at 414. The session identifier can include any suitable data that can be used to identify an authorized control session, such as any suitable length of random numbers, symbols, characters, hash values, and/or any other suitable values that can be used to identify a session. In some implementations, the session key can be any suitable cryptographic key that can be used to sign, encrypt and/or decrypt messages in an authorized control session. In some implementation, the session key can be an ephemeral signing key.

At 416, process 400 can transmit the session identifier and the session key to the sender device. The session identifier and the session key can be transmitted in any suitable manner. For example, the session identifier and the session key can be transmitted via an encrypted communication protocol, such as the HTTPS and/or any other suitable communication protocol that utilizes a cryptographic protocol, such as Security Sockets Layer (SSL), Transport Layer Security (TLS), and/or any other suitable cryptographic protocol.

In some implementations, process 400 can loop back to 402 after performing step 416.

Turning to FIG. 5, a flow chart of an example 500 of a process for providing access control for a digital media receiver by authenticating a sender application in accordance with some implementations of the disclosed subject matter is shown. In some implementations, process 500 can be implemented by a suitable server, such as a server 110 of FIG. 1.

As illustrated, process 500 can begin by waiting for a request message to arrive at 502. Step 502 can be performed in substantially the same manner as step 402 of FIG. 4 in some implementations.

Next, at 504, process 500 can receive an authentication request from a digital media receiver. The authentication request can include any suitable information. For example, the authentication request can include an application identifier associated with a sender device, such as an application identifier that identifies a sender application executing on the sender device. In some implementations, the application identifier can include any suitable length of numbers, characters, symbols, and/or any other suitable values that can identify the sender application.

Next, at 506, process 500 can transmit a message to the digital media receiver. In some implementations, the message can include a nonce that can correspond to a timestamp, a counter, a random number, a hash value, and/or any other suitable value.

At 508, process 500 can receive a response corresponding to the message from the digital media receiver. In some implementations, the response can include a session token (e.g., a signed value generated by signing a session identifier, a timestamp, a nonce, and/or any other suitable data using a session key), a digital signature (e.g., a signed nonce generated by signing the nonce using a private key associated with the digital media receiver), a certificate associated with the digital media receiver (e.g., an X.509 certificate), and/or any other suitable information.

At 510, process 500 can determine whether the digital media receiver is a valid receiver. This determination can be made in any suitable manner. For example, the determination can be made by verifying the session token. In a more particular example, the session token can be verified using a suitable authentication algorithm (e.g., by decrypting the session token using a session key associated with the session token). As another example, the determination can be made by validating the certificate associated with the digital media receiver using a suitable authentication algorithm. In a more particular example, the certificate can be validated based on a chain of trust. As yet another example, the determination can be made by verifying the digital signature associated with the digital media receiver. In a more particular example, the digital signature can be verified by processing the signed nonce using a public key, processing the nonce using a suitable hash function, and comparing the processed signed nonce and the processed nonce.

In some implementations, in response to determining that the digital media receiver is not a valid receiver, process 500 can send a response message to the digital media receiver at 512 indicating such determination and can then loop back to 502.

Alternatively, process 500 can determine whether the application identifier associated with the sender device identifies a valid sender application at 514. This determination can be made in any suitable manner. For example, the sender application identified by the application identifier can be regarded as being valid when the application identifier is valid. In a more particular example, a valid application identifier can identify a sender application that can perform particular functions (e.g., streaming media content), a sender application that is associated with a particular source, and/or any other suitable sender application that can be regarded as being valid.

In some implementations, in response to determining that the application identifier associated with the sender device identifies an invalid sender application, process 500 can send a response message to the digital media receiver indicating this determination at 516.

Alternatively, process 500 can transmit a session key associated with the session token to the digital media receiver at 518 in response to determining that the application identifier associated with the sender device identifies a valid sender application. In some implementations, the session key can be a signing key based on which the session token is generated.

In some implementations, process 500 can loop back to 502 after performing 516 or 518.

It should be noted that the above steps of the flow diagrams of FIGS. 3-5 can be executed or performed in any order or sequence not limited to the order and sequence shown and described in the figures. Also, some of the above steps of the flow diagrams of FIGS. 3-5 can be executed or performed substantially simultaneously where appropriate or in parallel to reduce latency and processing times. Furthermore, it should be noted that FIGS. 3-5 are provided as examples only. At least some of the steps shown in these figures may be performed in a different order than represented, performed concurrently, or altogether omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for providing access control for a computing device are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A method for providing access control by a server for a computing device, the method comprising:
   receiving, at the server, a first request to authenticate the computing device from a first sender device, wherein the request includes an application identifier to identify an application executing on the first sender device;
   authenticating the computing device based at least in part on the first request;
   transmitting a session identifier and a session key to the first sender device;
   receiving the application identifier associated with the first sender device from the computing device;
   determining, using a hardware processor, whether a sender application executing on the first sender device is valid based at least in part on the application identifier; and
   transmitting the session key to the computing device in response to determining that the sender application is valid to establish secure communications between the first sender device and the computing device.

2. The method of claim 1, further comprising:
   receiving, from the computing device, a session token associated with the session key and the session identifier; and
   authenticating the computing device based at least in part on the session token.

3. The method of claim 1, wherein the first request to authenticate the computing device comprises a certificate associated with the computing device.

4. The method of claim 3, further comprising authenticating the computing device by validating the certificate associated with the computing device.

5. The method of claim 3, further comprising:
   receiving a second request to authenticate the computing device from a second sender device, wherein the second request comprises the certificate associated with the computing device; and
   transmitting the session key and the session identifier to the second computing device in response to determining that the second sender device is associated with the application identifier.

6. The method of claim 5, wherein the second request comprises the application identifier.

7. The method of claim 1, wherein the first request to authenticate the computing device comprises a first digital signature generated by the computing device.

8. The method of claim 7, further comprising authenticating the computing device by verifying the first digital signature.

9. The method of claim 8, further comprising:
   receiving a second digital signature from the computing device; and
   determining whether the computing device is a valid receiver based at least in part on the second digital signature.

10. The method of claim 1, wherein the computing device is a digital media receiver.

11. A system for providing access control for a computing device, the system comprising:
    a server comprising at least a hardware processor that is configured to:
    receive a first request to authenticate the computing device from a first sender device, wherein the request includes an application identifier to identify an application executing on the first sender device;
    authenticate the computing device based at least in part on the first request;
    transmit a session identifier and a session key to the first sender device;
    receive the application identifier associated with the first sender device from the computing device;
    determine whether a sender application executing on the first sender device is valid based at least in part on the application identifier; and
    transmit the session key to the computing device in response to determining that the sender application is valid to establish secure communications between the first sender device and the computing device.

12. The system of claim 11, wherein the hardware processor is further configured to:
    receive, from the computing device, a session token associated with the session key and the session identifier; and
    authenticate the computing device based at least in part on the session token.

13. The system of claim 11, wherein the first request to authenticate the computing device comprises a certificate associated with the computing device.

14. The system of claim 13, wherein the hardware processor is further configured to authenticate the computing device by validating the certificate associated with the computing device.

15. The system of claim 13, wherein the hardware processor is further configured to:
    receive a second request to authenticate the computing device from a second sender device, wherein the second request comprises the certificate associated with the computing device; and
    transmit the session key and the session identifier to the second computing device in response to determining that the second sender device is associated with the application identifier.

16. The system of claim 15, wherein the second request comprises the application identifier.

17. The system of claim 11, wherein the first request to authenticate the computing device comprises a first digital signature generated by the computing device.

18. The system of claim 17, wherein the hardware processor is further configured to authenticate the computing device by verifying the first digital signature.

19. The system of claim 18, wherein the hardware processor is further configured to:
    receive a second digital signature from the computing device; and
    determine whether the computing device is a valid receiver based at least in part on the second digital signature.

20. The system of claim 11, wherein the computing device is a digital media receiver.

21. A non-transitory computer-readable medium containing computer-executable instructions that, when executed by a processor, cause the processor to perform a method for providing access control by a server for a computing device, the method comprising:
    receiving, at a server, a first request to authenticate the computing device from a first sender device, wherein the request includes an application identifier to identify an application executing on the first sender device;
    authenticating by the server the computing device based at least in part on the first request;

transmitting a session identifier and a session key to the first sender device;

receiving the application identifier associated with the first sender device from the computing device;

determining whether a sender application executing on the first sender device is valid based at least in part on the application identifier; and transmitting the session key to the computing device in response to determining that the sender application is valid to establish secure communications between the first sender device and the computing device.

22. The non-transitory computer-readable medium of claim 21, wherein the method further comprises:

receiving, from the computing device, a session token associated with the session key and the session identifier; and authenticating the computing device based at least in part on the session token.

23. The non-transitory computer-readable medium of claim 21, wherein the first request to authenticate the computing device comprises a certificate associated with the computing device.

24. The non-transitory computer-readable medium of claim 23, wherein the method further comprises authenticating the computing device by validating the certificate associated with the computing device.

25. The non-transitory computer-readable medium of claim 23, wherein the method further comprises:

receiving a second request to authenticate the computing device from a second sender device, wherein the second request comprises the certificate associated with the computing device; and transmitting the session key and the session identifier to the second computing device in response to determining that the second sender device is associated with the application identifier.

26. The non-transitory computer-readable medium of claim 25, wherein the second request comprises the application identifier.

27. The non-transitory computer-readable medium of claim 21, wherein the first request to authenticate the computing device comprises a first digital signature generated by the computing device.

28. The non-transitory computer-readable medium of claim 27, wherein the method further comprises authenticating the computing device by verifying the first digital signature.

29. The non-transitory computer-readable medium of claim 28, wherein the method further comprises:

receiving a second digital signature from the computing device; and determining whether the computing device is a valid receiver based at least in part on the second digital signature.

30. The non-transitory computer-readable medium of claim 21, wherein the computing device is a digital media receiver.

* * * * *